United States Patent [19]

Hengst

[11] 4,354,655
[45] Oct. 19, 1982

[54] MOUNTING BASE CONSTRUCTION

[76] Inventor: Erwin M. Hengst, 2603 Cocoa La., Pasadena, Tex. 77502

[21] Appl. No.: 180,462

[22] Filed: Aug. 22, 1980

[51] Int. Cl.³ ............................................. F16M 1/00
[52] U.S. Cl. .................................... 248/679; 248/676
[58] Field of Search .............. 248/676, 678, 679, 680, 248/681, 660; 52/704, 707, 710

[56] References Cited

U.S. PATENT DOCUMENTS

| 2,345,650 | 4/1944 | Attwood | 52/710 X |
| 2,378,106 | 6/1945 | Rosenzweig | 248/635 |
| 2,380,379 | 7/1945 | Attwood | 52/710 X |
| 2,398,239 | 4/1946 | Melin | 248/679 X |
| 3,138,358 | 6/1964 | Comstock et al. | 248/635 |
| 3,221,400 | 12/1965 | Halsey | 248/676 X |
| 3,334,850 | 8/1967 | Jackson et al. | 248/679 |
| 4,130,977 | 12/1978 | Taylor | 52/710 |

FOREIGN PATENT DOCUMENTS

| 2458287 | 6/1976 | Fed. Rep. of Germany | 248/676 |
| 1346813 | 11/1963 | France | 248/678 |

*Primary Examiner*—J. Franklin Foss
*Attorney, Agent, or Firm*—Browning, Bushman, Zamecki & Anderson

[57] ABSTRACT

An equipment mounting apparatus includes a base formed from a cast aggregate material. Parallel steel U-shaped channels are cast in the base, with the sides of the channels rolled over at their top edges to provide downwardly facing longitudinally parallel rails. Cleats are formed on the bottom of the channels in the aggregate base. A spring biased fastener assembly is positioned in the channel with a threaded aperture opening upwardly to receive a bolt connected to equipment to be mounted on the base. The upper surface of the fastener assembly has parallel channels formed therein which are arranged to matingly receive the parallel edges of the rails formed by the rolled over channel sides. Projections are formed in the upwardly facing bottom surface of the fastener assembly channels to frictionally grip the rail edge and prevents slippage between the fastener assembly and the U-shaped channels.

8 Claims, 4 Drawing Figures

MOUNTING BASE CONSTRUCTION

BACKGROUND OF THE INVENTION

The present invention pertains to an equipment mounting apparatus and more particularly to a conveniently adaptable apparatus having a weighted base member for stably mounting a variety of equipment which may be subjected to motion.

Usually, equipment mounting procedures are determined by the specific environment in which the mounting is to occur as well as the unique characteristics of the equipment, including its shape, weight and any other such features which might affect the manner of mounting the equipment.

For example, exhaust blowers for venting laboratory fume hoods, and/or commercial air-conditioning equipment and in particular commercial air cooling equipment is normally mounted on the exterior of a building, in as much as one of the major functions of such systems is to remove contaminants, moisture and heat from a building interior and transfer same to the exterior of the building. Thus the compressor, blowers, heat exchangers, etc. associated with such systems are normally positioned outside the building and usually on top of the the building. Heretofore, the typical procedure followed in mounting such apparatus has been to build a base from planks of moisture resistant wood such as redwood or cedar and mount the equipment thereon. Wood has the advantage of being easy to fabricate and light-weight to transport to the roof. Wood, however, even when of a moisture resistant variety, is subject to rot and deterioration when subjected to the extreme moisture conditions of a rooftop where rain and snow accumulate. In addition equipment involved in air-conditioning processes is likely to be further encumbered with moisture laden air which further aggravates the moisture condition to which the equipment base is subjected.

Additionally, such motor operated equipment is constantly subjected to vibrations when operating and thus not only is the base subjected to moisture but also to vibration which tends to further aggravate the mechanical failure of a base and in particular a base which is suffering deterioration as a result of a moisture laden environment.

Also, it is often necessary with equipment of this sort to match its location with that of another piece of equipment or with ducts or the like. This may require precise fabrication of mounting bases and further, if the base is lagged to its supporting surface such as a floor or rooftop, it may be difficult to adjust its position should that be necessary, to accommodate its relative position to other apparatus.

Lastly, it is helpful if the equipment mounting is solidly situated so that the equipment is not likely to move relative to the supporting surface and yet it is often preferable not to lag or bolt such equipment to the supporting surface.

It is therefore an object of the present invention to provide a new and improved equipment mounting apparatus which is durable under all weather conditions, easy to install in a fairly inaccessable location such as a rooftop, conveniently adjustable to accommodate a variety of equipment base dimensions, isolative of motion and vibration of the equipment, and simple to install on the mounting surface and the equipment.

SUMMARY OF THE INVENTION

With this and other objects in view, the present invention contemplates an equipment mounting apparatus having a precast aggregate base with parallel channels. The channels have rolled over top edges at the side of each channel forming downwardly projecting parallel rails. A short transverse bar is slidably positioned between the channel sides below the rails. A pair of grooves on the top side of each bar is arranged to matingly engage the parallel rails. A threaded aperture on the bar is aligned with a coil spring positioned between the bar and the bottom of the channel. A bolt or the like, which extends through equipment to be mounted, is threadly connected to the aperture in the bar and pulls the bar up against the rails.

Another aspect of the invention includes a resilient member positioned about the bolt between the equipment to be mounted and the rolled over top edges of the channel sides.

Yet another aspect of the invention utilizes another set of parallel rails mounted at right angles to the first parallel rails and also having parallel downwardly projecting rails formed on each side of the channels for receiving a grooved, spring supported bar.

Still another aspect of the present invention involves tangs projecting downwardly from the channels and embedded in the precast material of the base.

Yet still another aspect of the invention includes a channel on the side wall of the base and having the mounting features of the previously described channels for accommodating equipment associated with the equipment to be mounted on the parallel channel members.

DETAILED DESCRIPTION OF THE INVENTION

Figure 1:
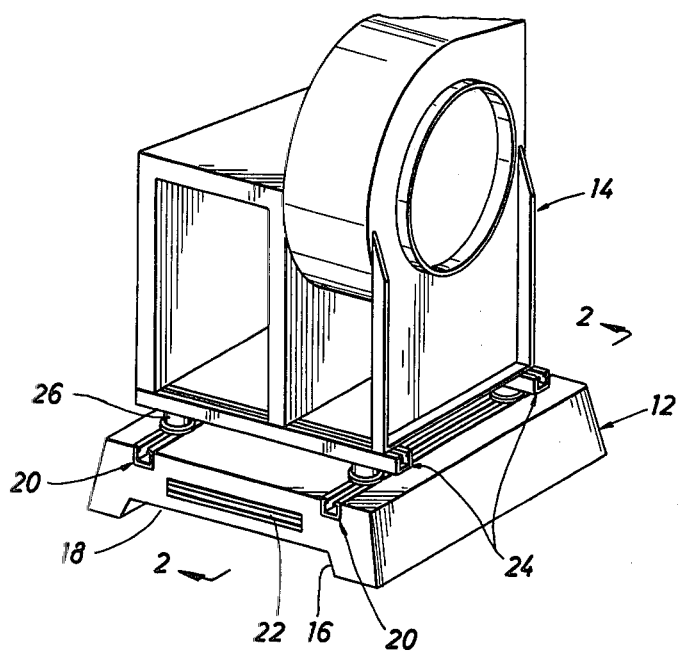
FIG. 1 is a perspective view of an equipment mounting apparatus in accordance with the present invention and showing a blower or the like mounted thereon.

Referring first to FIG. 1 of the drawings an equipment mounting base 12 is shown supporting an illustrative piece of equipment 14 such as a blower. The base 12 is formed of a cast material such as an aggregate or the like. A lighter material such as fiberglass could be used if a massive base were not required to hold equipment in place. However, most equipment of the sort for which this invention was inspired is of a nature requiring a solidly anchored base and therefore a heavier material such as concrete is called for.

Downwardly projecting parallel leg members 16 are formed on the base and leave an opening 18 therebetween to accommodate drainage. A pair of parallel channel members 20 are shown embedded in the base 12. Another channel member 22 is shown positioned on the front side of the base 12 and is likewise embedded in the cast aggregate material.

The equipment is shown supported by a pair of parallel channel members 24 which are mounted on top of and at right angles to the parallel channel members 20. Resilient rubber shock or vibration mounts 26 are positioned between the respective pairs of channel members 20, 24.

Figure 2:
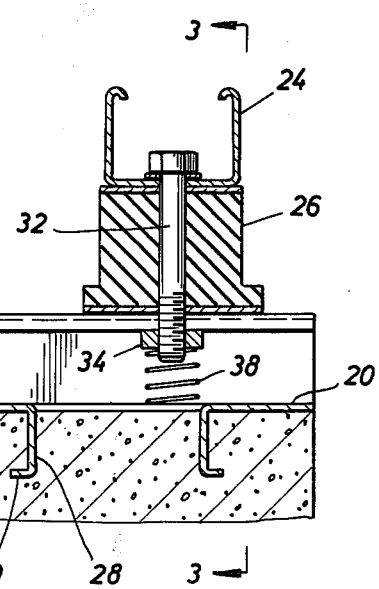
FIG. 2 is a partial side elevational cross-sectional view taken along lines 2—2 of FIG. 1 showing a channel embedded in the base of the apparatus and equipment mounting members arranged in the channel.

Referring next to FIG. 2 of the drawings one of the channel members 20 is shown in cross section embedded in the aggregate base 12. A series of downwardly projecting tangs 28, having bent end portions 30 are shown likewise embedded in the cast base 12 and function to fixedly secure the channels into the base matrix. The rubber mount 26 is shown positioned on top of the channel and supports at its upper end the transverse channel 24. A bolt 32 is shown positioned through the bottom of channel 24 and extends through an aperture formed in the center of resilient mount 26. The bolt is threadly received within a short bar or nut 34 positioned across the channel 20 between its side walls 36 as shown in FIG. 3.

Figure 3:
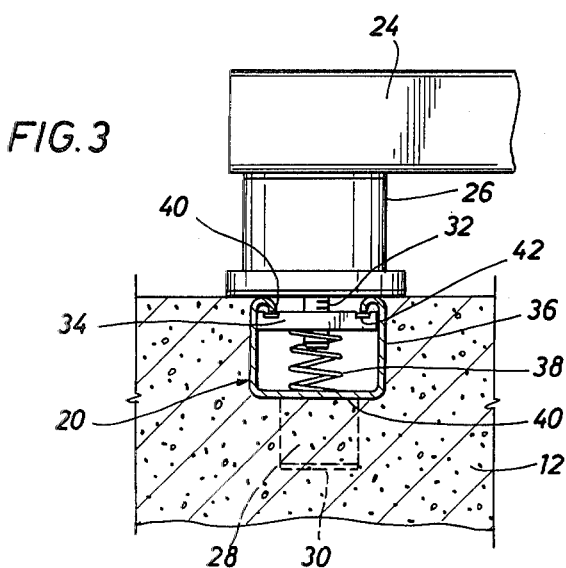
FIG. 3 is a cross-sectional view taken along lines 3—3 of FIG. 2 showing the channel and mounting member in the channel.

Referring now to FIG. 3, the bar 34 is supported upwardly in the channel 20 by means of a coil spring 38 which extends between the bottom wall 40 of the channel and the bottom of bar 34.

Figure 4:
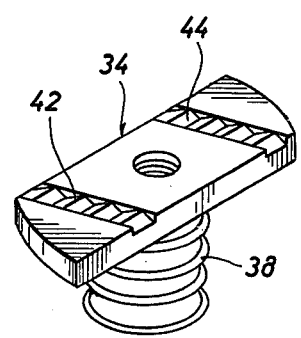
FIG. 4 is a perspective view of the equipment mounting member.

The top of the side walls 36 of the channels 20 and 24 are formed over to provide downwardly projecting edges 40 which take the shape of inverted rails. These rails 40 are matingly received in parallel grooves 42 (FIG. 4) formed in the upper surface of the bar 34. Transverse ridges 44 are embossed in the grooves to form a traction surface therein to prevent movement between the grooves 42 and rails 40 when the bolt 32 tightens the mounting apparatus into operational assemblage. The spring 38 has its upper coil end (not shown) swedged into a groove in the bottom surface of the nut 34 to connect the spring to the nut, forming an equipment mounting member.

In the use of the apparatus just described, equipment 14 to be mounted is attached to the top channel members 24 by means of the bolt and equipment mounting members as described above. Next bolts are passed through the bottom of channels 24 and through resilient mounts 26 as shown in FIG. 2 to threadly engage the nut 34 which is slidably arranged in channel 20. The equipment is then precisely adjusted on the base relative to adjacent apparatus and the bolts 32 are tightened to pull the grooves 42 in nuts 34 against the rails 40. The embossed ridges 44 then hold the nuts from horizontal movement in the channel.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. Apparatus for mounting equipment, including:
base means cast from a moldable weatherproof material, said base means being of sufficient mass to act as a stabilizing base for equipment to be mounted thereon;
a first pair of parallel channel members embedded in said cast base, said channel members including formed over edges at the top of on each side of said channel members to provide downwardly projecting rail means;
a second pair of parallel channel members positioned over said first pair of channel members and at right angles with respect thereto;
equipment mounting means in said first pair of channel members, said equipment mounting means having slide portions for matingly engaging said rail means;
motion isolation means positioned between said first and second pair of parallel channel members, said motion isolation means being a resilient member having an aperture therethrough; and
bolt means positioned through the bottom of said second channel members, through the aperture in said resilient member, and into holding connection with said equipment mounting means.

2. The apparatus of claim 1 wherein said equipment mounting means includes a bar sized to fit between the side walls of said channel members under said rail means; and parallel grooves formed in the top of said bar and arranged to matingly engage said rail means.

3. The apparatus of claim 2 and further including a threaded aperture formed through said bar between said grooves, and coil spring means on the bottom of said bar with the center of said coil spring positioned over the bottom of said aperture.

4. The apparatus of claim 3 and further including resilient means between said first and second channel members, said resilient means having an aperture therethrough; and bolt means positioned through the bottom of said second channel members, through the aperture in said resilient means, and threaded into the aperture formed through said bar.

5. The apparatus of claim 1 wherein said base means is formed from an aggregate and further including a third channel member positioned on the side of said base means for mounting additional apparatus associated with the equipment mounted on said parallel channel members.

6. Apparatus for mounting motorized equipment in an all weather environment, which equipment is subject to vibration, comprising:
precast aggregate base means of sufficient mass to anchor heavy motorized equipment against movement;
channel means forming longitudinal, parallel recesses in said base means, the upper edge of said channel means being flush with the top surface of said base means, said channel means being comprised of "U" shaped metal channels having projection means extending downwardly from the base of said "U" shaped channel and embedded in said aggregate base to secure said channels to said base;
downwardly projecting parallel rail means extending longitudinally along each side of each of said recesses;
equipment mounting means in said channel means, said equipment mounting means having groove means for matingly engaging said rail means, said groove means being a pair of grooves formed on the top surface of a short bar, said short bar having a threaded aperture formed therethrough between said grooves;
spring means on said equipment mounting means for maintaining said groove means in engagement with said rail means;
bolt means for passing through a portion of the equipment to be mounted and into said threaded aperture to press said grooves against said rail means; and
motion isolation means around said bolt means and arranged to be positioned between the equipment to be mounted and the top of said channel means, said motion isolation means comprising a resilient pad having an aperture for receiving said bolt means therethrough with the bottom of said pad resting on the top of said downwardly projecting parallel rail means.

7. The apparatus of claim 6 wherein said spring means comprises a coil spring, said coil spring being fastened to the bottom side of said bar with the center of said coil spring positioned over said aperture.

8. The apparatus of claim 6 and further including transverse ridge means formed in said grooves for providing a friction surface between said rail means and said grooves in said equipment mounting means to prevent said equipment mounting means from moving on said rail means when equipment is mounted on said equipment mounting means.

* * * * *